Patented Nov. 3, 1942

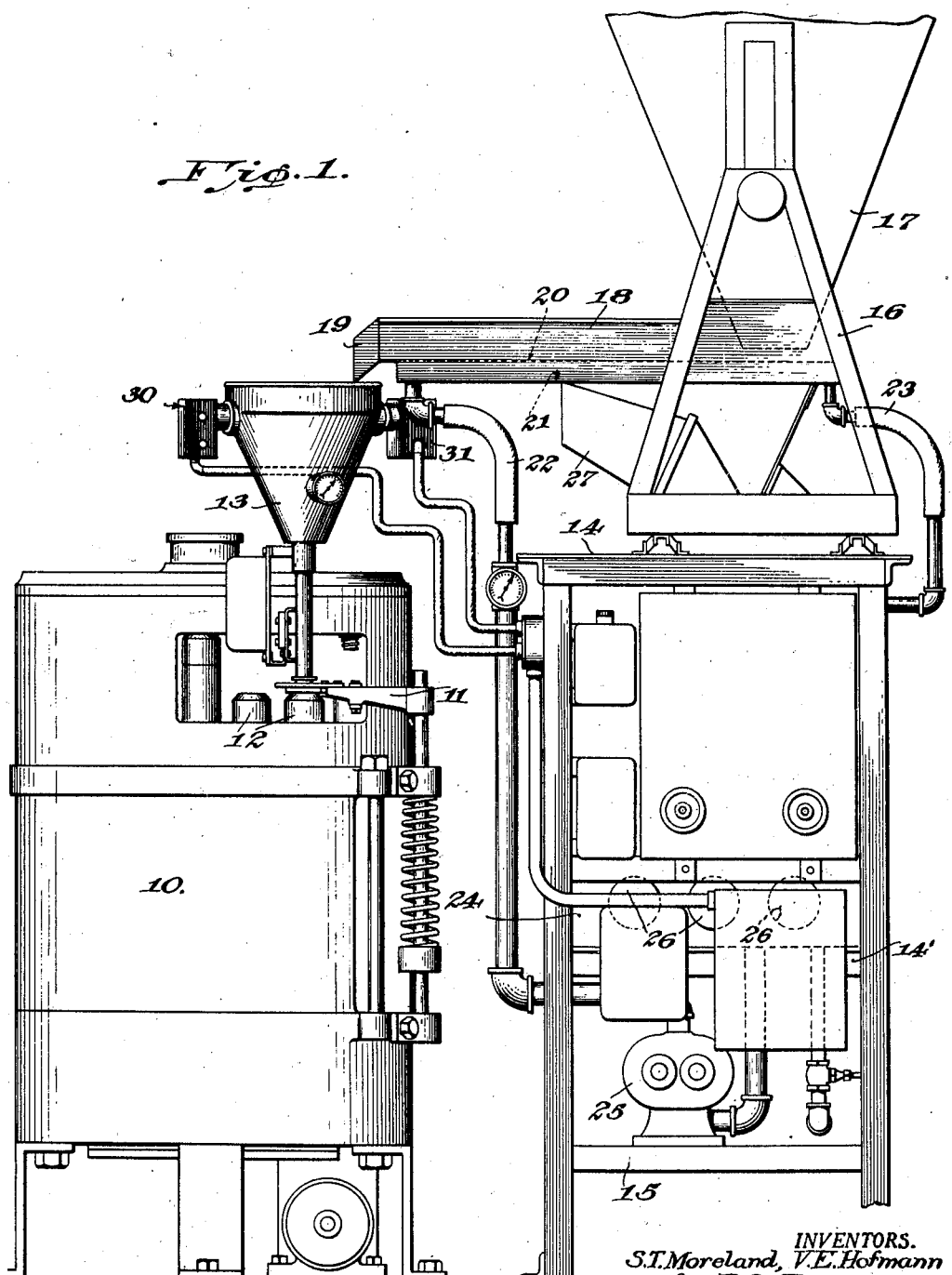

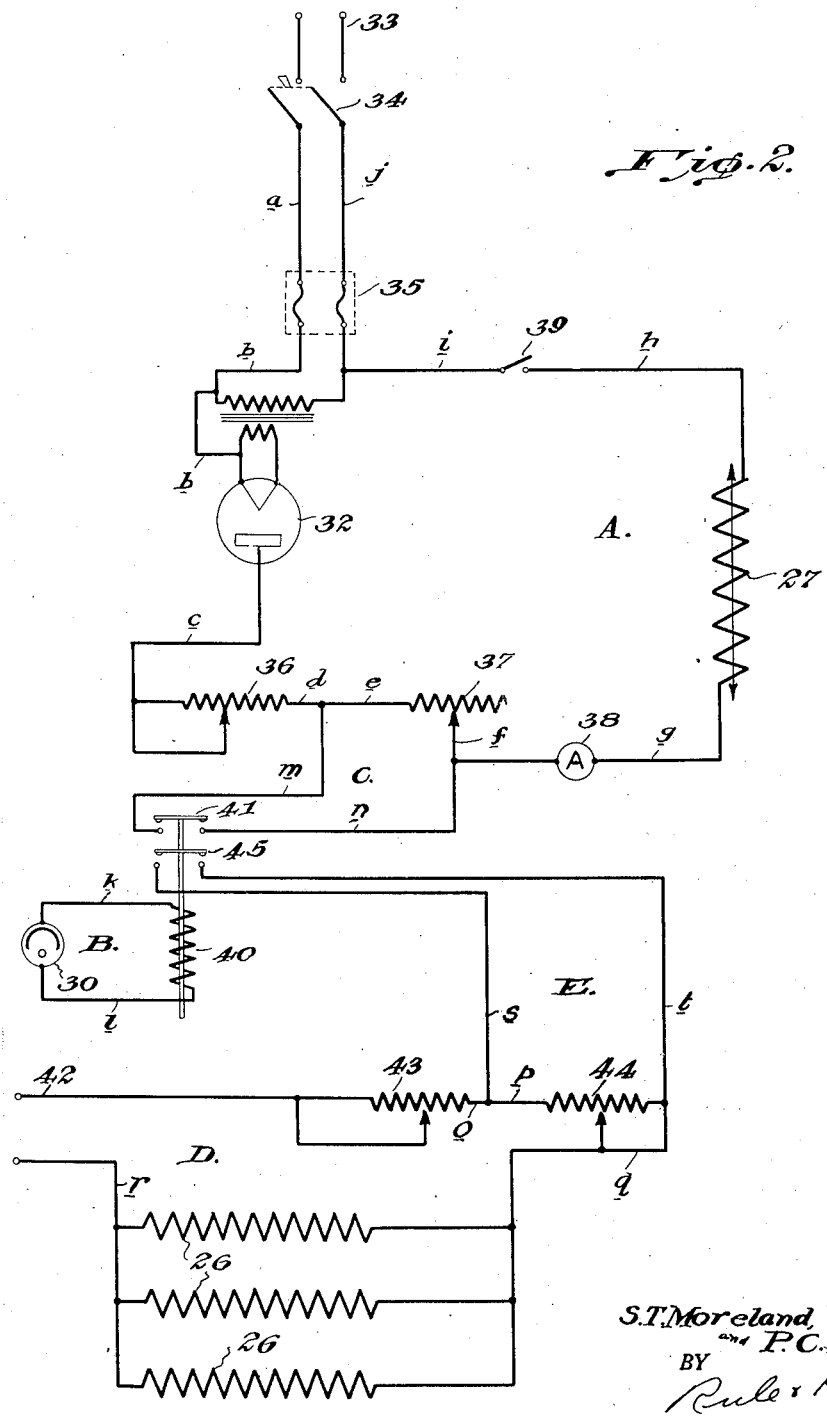

2,301,136

UNITED STATES PATENT OFFICE 2,301,136

FLOW CONTROL APPARATUS

Stephen T. Moreland, Victor E. Hofmann, and Parker C. Tracy, Toledo, Ohio, assignors to Owens-Illinois Glass Company, a corporation of Ohio Application February 23, 1939, Serial No. 257,976

9 Claims. (Cl. 221—118)

The flow control apparatus comprising the present invention is primarily adapted for use in regulating the rate of flow of granular thermoplastic or thermosetting molding material from a supply hopper through a preheating apparatus to a temperature equalizing hopper immediately prior to introduction of the material to the molds of a rotary molding machine. The invention, however, is capable of other applications and the flow control apparatus may, if desired, be employed for regulating the flow of all manner of comminuted or granular materials into a receptacle from which they are periodically or steadily withdrawn.

In the operation of rotary or other molding machines considerable shortening of the actual molding cycle may be obtained by preheating the moldable material prior to its introduction to the molds of the machine. One method currently employed for thus preheating the moldable material is disclosed in Patent No. 2,235,324, to Stephen T. Moreland, March 18, 1941, for a Method of and apparatus for preheating moldable materials. Briefly, the apparatus for carrying out the method employed consists of a vibrating hopper in which the supply body of granular moldable material is contained and which discharges the material into a vibrating conveyor trough, the bottom of which is heated. The rate of discharge of moldable material from the hopper is sufficiently slow that the material will not accumulate in the trough and thus at all times only a single layer of the granular material will occupy a position on the heated bottom of the trough. In this manner each and every granule of the material will absorb heat from the trough bottom as it progresses therealong. Vibration of the trough causes the granules to be agitated and advanced along the trough toward a discharge leading to a "soaking hopper" from which the material is withdrawn periodically and fed to the molds of the molding machine. During the "soaking" operation in the "soaking hopper," the granules which have very poor heat conducting qualities and which are consequently hotter in their surface regions than in the interior thereof assume a more even temperature throughout which is conducive toward the production of molded articles of better quality.

In molding articles of relatively great bulk a comparatively long molding cycle is required and consequently the rate of rotation of the molding machine will be relatively slow. Conversely, in molding articles of small size, particularly thin walled articles, a short cycle is required and consequently the rate of rotation of the machine will be relatively fast. Heretofore, other things being equal, in order to prevent the "soaking hopper" from overflowing in the former instance, and to prevent the same from being depleted in the latter instance, the operator has resorted to visual inspection of the soaking hopper and manual correction of the rate of flow of the moldable material from the preheating trough into the soaking hopper.

The present invention is designed to obviate such visual inspection of the soaking hopper and manual control of the rate of flow of the material to the soaking hopper from the preheating trough by the provision of an automatic leveling apparatus which will maintain a constant level of moldable material in the soaking hopper regardless of variations in the rate of consumption of the material by the molding machine.

This being the principal object of the invention, it is a further object thereof to provide such an apparatus which will not only automatically maintain a constant level of moldable material in the soaking hopper but which will operate to deliver moldable material to the hopper from the vibrating preheating trough at a constant temperature to obtain maximum uniformity of distribution of heat in the soaking hopper.

Briefly, in carrying out the above mentioned objects, the invention contemplates the use of a photo-electric cell together with an energizing source of light, the former being disposed at the desired level at which the material is to be maintained in the soaking hopper and the latter being opposed thereto in such a manner that when the source of light to the cell is intercepted by a rise in the level of the material in the hopper, the cell is deenergized and, conversely, when the source of light is again uncovered by a lowering of the level of material, the cell is energized. The photo-electric cell is electrically connected to a relay-operated switch, the movements of which it controls and which in turn control the energization and deenergization of two independent electrical circuits, one leading to the heating elements for regulating the temperature of the preheating trough, and the other leading to the vibrator magnet which controls the rate of vibration of the trough and consequently the rate of discharge of moldable material therefrom into the soaking hopper.

By an arrangement of the character set forth above, as the rate of discharge of moldable material from the preheating trough into the soaking hopper is increased, the temperature of the effective heating surface of the trough is raised to compensate for the correspondingly shorter length of time particles of moldable material introduced into the latter will remain therein before finding their way to a discharge therefrom.

Other objects and advantages of the invention, not at this time particularly enumerated, will become apparent as the nature of the invention is better understood.

In the accompanying drawings:

Fig. 1 is a side elevational view of a rotary molding machine, feeding and preheating apparatus showing the improved flow control apparatus applied thereto, and Fig. 2 is a diagrammatic view illustrating the electrical circuits involved in connection with the flow control apparatus.

Referring now to Fig. 1, a conventional molding machine 10 is provided with a feeding device 11 for the molds 12 thereof. A feeder hopper 13 is adapted to receive therein the preheated moldable material for transfer in segregated amounts by the feeding device 11 to the molds 12.

The apparatus for preheating the moldable material prior to delivery thereof to the hopper 13 comprises a table-like structure including an upper platform 14, an intermediate platform 14', and a lower platform 15. A frame-like cradle 16 secured to the upper platform 14 has suspended therein a supply hopper 17 of funnel-shape design. The lower end of the hopper 17 communicates with a conveyor-trough 18, the forward end of which is provided with a downwardly extending chute 19 by means of which moldable material is introduced by gravity to the feeder hopper 13. The bottom 20 of the conveyor-trough 18 is substantially level and, upon agitation of the conveyor-trough, the material fed onto the same by the hopper 17 adjacent the rear end thereof travels forwardly on the bottom thereof and is discharged into the feeder hopper 13.

Coextensive with the bottom 20 of the conveyor-trough 18 is a comparatively shallow chamber 21 having an inlet connection 22 and an outlet connection 23 leading respectively from and to an electrically heated tank 24 mounted on the intermediate platform 14'. A pump 25, mounted on the lower platform 15 is provided in the connector 22 for the purpose of circulating heating fluid such as water, oil, glycerine or the like through the circuit including the tank 24 and chamber 21. Heating elements 26 disposed in the tank 24 serve to heat the fluid therein, the operation of these elements being controlled in a manner that will appear presently.

In order to cause the moldable material fed from the supply hopper 17 to be moved along the bottom 20 of the conveyor-trough 18 toward the chute 19, means is provided for agitating the conveyor-trough. Toward this end a magnetic vibrator unit 27 is secured to the underneath side of the conveyor-trough 18 and is supported from the upper platform 14 in any suitable manner. The vibrator unit 27 is so designed that the vibrations imparted to the conveyor-trough 18 cause the latter, within the limits of its vibration, to move forwardly and upwardly in one direction and rearwardly and downwardly in the other direction, thus imparting a pitching movement to the particles of moldable material whereby they are constantly agitated and carried forwardly on the conveyor bottom 20.

Under certain conditions of manufacture, as, for example, where the molds 12 of the molding machine 10 are converted over for the formation of smaller or thinner walled articles than previously, it will be necessary to run the machine at higher speed to compensate for the shorter molding cycle required. In order to prevent the level of material maintained in the feeder hopper 13 from falling below the required level, means is provided under these circumstances for automatically speeding up the rate of vibration of the conveyor-trough 18 to pass the material therealong more rapidly. Because of the fact that a more rapid passage of the particles across the bottom of the conveyor-trough will result in a shorter period of preheating, means is further provided for increasing the heating capacity of fluid being circulated through the chamber 21.

Toward these ends, referring additionally to Fig. 2, a photo-electric cell 30 is mounted in the feeder hopper 13 at one side thereof and is adapted to be energized by a beam of light emanating from a source 31 positioned in the hopper directly across from the cell. Obviously, when the level of moldable material in the hopper is higher than the source 31 of light, the beam will be intercepted and the photo-electric cell deenergized whereas when the level falls below that of the source, the beam will be restored and the cell energized.

Referring now specifically to Fig. 2, the vibrator unit 27 requires direct current for its operation and accordingly this vibrator unit is disposed in an electrical circuit designated generally at A and including therein a rectifier tube 32 for converting alternating line current to direct current of the desired voltage. Specifically, the circuit A leads from a source 33 through a line switch 34, wire $a$, fuse block 35, wire $b$, rectifier tube 32, wire $c$, manually controlled rheostat 36, wires $d$ and $e$, automatically controlled and manually adjustable rheostat 37, wire $f$, ammeter 38, wire $g$, vibrator unit 27, wire $h$, switch 39, wire $i$, fuse block 35, wire $j$, and line switch 34 to the source 33. The circuit just described is adapted to remain closed at all times during the operation of the molding machine in order that a certain amount or volume of current may be supplied to the vibrator unit 27 to actuate the same at a comparatively reduced speed.

When, for any reason whatsoever, the operation of the molding machine is speeded up, the manually adjustable rheostat 37 is adapted to be automatically shunted out of the circuit A by functioning of the photo-electric cell 30 in a relay circuit B including wires $k$ and $l$ leading to the windings of a double pole solenoid actuated relay switch 40. One pole 41 of the switch 40 is adapted to close a by-pass circuit C by means of which the rheostat 37 is cut out of the circuit A and including wires $m$ and $n$ connecting the switch 40 into the circuit A on opposite sides of the rheostat 37. Thus it will be seen that when the level of moldable material in the feeder hopper 13 falls sufficiently low to uncover the beam of light directed at the photo-electric cell 30, the switch 40 upon becoming closed will cause current to flow through the circuit A and the by-pass circuit C, thus excluding the resistance afforded by the rheostat 37, and supply a greater current output for actuating the vibrator unit 27. As a consequence, the greater amplitude of vibration of the vibrator unit 27 will cause a corresponding increase in the rate of travel of material through the conveyor-trough 18 together with an increase in volume per unit time of the material delivered to the feeder hopper 13. The increase of the rate of delivery of material to the feeder hopper 13 will bring the level of material therein up to normal and, upon intercepting of the light beam for energizing the photo-electric cell 33, the relay circuit B will become opened, thus opening the switch 40 and restoring the flow of current for the vibrator unit 27 solely to the circuit A.

Because of the fact that an increase in the rate of flow of the material along the conveyor-trough 18 will shorten the length of time the particles thereof remain in contact with the heated bottom 20, it is necessary to supply additional current over and above the normal current supply to the heating elements 26 in the heating tank 24. The normal current supply to these heating elements 26 is conducted through an electrical circuit D leading from a source 42 through a manually controlled rheostat 43, wires o and p, automatically controlled and manually adjustable rheostat 44, wire q, heating elements 26, and wire r to the source.

The other pole 45 of the double pole switch 40 is adapted to close a by-pass circuit E by means of which the rheostat 44 is cut out of the circuit D and including wires s and t connecting the switch 40 into the circuit D on opposite sides of the rheostat 44. It will be seen that when the switch 40 becomes closed, current is caused to flow through the circuit D and the by-pass circuit E, thus excluding the resistance afforded by the rheostat 44, and supply a greater current output for energizing the heating elements 26.

Modifications may be resorted to within the spirit and scope of the appended claims.

We claim:

1. The combination of a feeder hopper, a vibrator trough arranged to deliver preheated moldable material to the hopper, means for supplying material to the trough, an electrical vibrator unit for applying impulses to the vibrator trough, an electrical resistance unit by which the vibrator trough is heated and heat imparted to said material in the trough, means for maintaining a constant level of the preheated material within the hopper and for automatically regulating the amount of heat supplied to the trough by the resistance unit, said last mentioned means comprising a photo-electric cell, means for supplying a beam of light and directing it across the hopper at a predetermined level and thereby energizing said cell, a relay circuit for the cell, a normally open double pole relay switch having windings in said circuit and adapted upon energization thereof to be closed, an electrical circuit for the vibrator unit including one pole of the switch, means in said last mentioned circuit and controlled by the switch for increasing the action of the vibrator when the switch is closed, and an electrical circuit for the resistance unit including the other pole of the switch.

2. The combination of a feeder hopper, a vibrator trough arranged to deliver preheated moldable material to the hopper, means for supplying material to the trough, an electrical vibrator unit for applying impulses to the vibrator trough, an electrical resistance unit by which the vibrator trough is heated and heat imparted to said material in the trough, means for maintaining a constant level of the preheated material within the hopper, said last mentioned means comprising a photo-electric cell, means for supplying a beam of light and directing it across the hopper at a predetermined level and thereby energizing said cell, a relay circuit for the cell, a normally open double pole relay switch having windings in said circuit and adapted upon energization thereof to be closed, an electrical circuit for the vibrator unit through which electrical energy is supplied for actuating the vibrator independently of said switch, a rheostat in said last mentioned circuit, an electrical circuit for the resistance unit, a rheostat in said latter electrical circuit, and shunt circuits for said rheostats, one pole of the switch being disposed in one of said shunt circuits and the other pole of the switch being disposed in the other said shunt circuit.

3. The combination of a feeder hopper, a vibrator trough arranged to deliver preheated moldable material to the hopper, means for supplying material to the trough, an electrical vibrator unit for applying impulses to the vibrator trough, an electrical resistance unit by which the vibrator trough is heated and heat imparted to said material in the trough, means for maintaining a constant level of the preheated material within the hopper, said last mentioned means comprising a photo-electric cell, means for supplying a beam of light and directing it across the hopper at a predetermined level and thereby energizing said cell, a relay circuit for the cell, a normally open double pole relay switch having windings in said circuit and adapted upon energization thereof to be closed, an electrical circuit for the vibrator unit, a rheostat in said electrical circuit, a by-pass circuit connected to the electrical circuit on opposite sides of the rheostat, one pole of the switch being disposed in the by-pass circuit, and an electrical circuit for the resistance unit, the other pole of the switch being disposed in the latter electrical circuit.

4. The combination of a feeder hopper, a vibrator trough arranged to deliver preheated moldable material to the hopper, means for supplying material to the trough, an electrical vibrator unit for applying impulses to the vibrator trough, an electrical resistance unit by which the vibrator trough is heated and heat imparted to said material in the trough, means for maintaining a constant level of the preheated material within the hopper, said last mentioned means comprising a photo-electric cell, means for supplying a beam of light and directing it across the hopper at a predetermined level and thereby energizing said cell, a relay circuit for the cell, a normally open double pole relay switch having windings in said circuit and adapted upon energization thereof to be closed, an electrical circuit for the vibrator unit, a rheostat in said electrical circuit, a by-pass circuit connected to the electrical circuit on opposite sides of the rheostat, one pole of the switch being disposed in the by-pass circuit, an electrical circuit for the resistance unit, a rheostat therein, and a by-pass circuit connected to said latter electrical circuit on opposite sides of the rheostat therein, the other pole of the switch being disposed in the latter by-pass circuit.

5. The combination of a feeder hopper, a vibrator trough arranged to deliver preheated moldable material to the hopper, means for supplying material to the trough, an electrical vibrator unit for applying impulses to the vibrator trough, an electrical resistance unit by which the vibrator trough is heated and heat imparted to said material in the trough, means for maintaining a constant level of the preheated material within the hopper, said last mentioned means comprising a photo-electric cell, means for supplying a beam of light and directing it across the hopper at a predetermined level and thereby energizing said cell, a relay circuit for the cell, a normally open double pole relay switch having windings in said circuit and adapted upon energization thereof to be closed, an electrical circuit for the vibrator unit, a pair of rheostats in said electrical circuit, a by-pass circuit connected to the electrical circuit on opposite sides of one of the rheostats, one pole of the switch being disposed in the by-pass circuit, an electrical circuit for the resistance unit, a pair of rheostats in said latter electrical circuit, and a by-pass circuit connected to said latter electrical circuit on opposite sides of one of the rheostats therein, the other pole of the switch being disposed in the latter electrical circuit.

6. The combination of a container for material and from which the material may be withdrawn at a variable rate, means for conveying material to the container from a source of supply, a heating fluid, means for supplying heat to said fluid, means for circulating said fluid in proximity to said conveying means and thereby supplying heat to the material while being conveyed to said container, means for varying the rate at which the material is conveyed to correspond to the rate at which it is being withdrawn from the container, and automatic means controlled by the volume of the material in said container for varying the temperature of the heating fluid and the amount of heat supplied to the material as it is being conveyed, to correspond with the rate at which it is conveyed and thereby maintaining a substantially constant temperature of the material as it is delivered to the container.

7. The combination of a hopper, a vibrator trough for delivering granular or comminuted material to the hopper, means for vibrating the trough at a variable rate corresponding to the rate at which material is withdrawn from the hopper and thereby varying the rate at which the material is fed to the hopper, means for circulating a heating fluid in proximity to the trough and thereby heating the trough and supplying heat to the material during its passage therethrough, and automatic means controlled by the level of the material in the hopper for supplying a variable amount of heat to said fluid to correspond with the rate at which the material is fed, and thereby automatically maintaining a substantially constant temperature of the material delivered from the trough to said hopper.

8. The combination of a feeder hopper, a vibrator trough, an electric vibrator unit for vibrating the trough, means for supplying material to the trough, said trough arranged to deliver the material to the hopper, means for maintaining a substantially constant level of the material in the hopper, means for circulating a heating fluid in proximity to the trough and thereby heating the material during its passage through the trough, and supplying the material at a substantially constant temperature to the hopper, means for supplying heat to said fluid, said means for maintaining a constant level and temperature including a photo-electric cell at said level, means for supplying a beam of light to the cell, means for decreasing the vibratory movement of the trough when the beam of light is intercepted by material in the trough, and automatic means for decreasing the amount of heat supplied when the movement of the trough and the rate at which the material is fed are decreased.

9. The combination of a hopper, a vibrator trough for delivering granular or comminuted material to the hopper, means for vibrating the trough at a variable rate corresponding to the rate at which material is withdrawn from the hopper and thereby varying the rate at which the material is fed to the hopper, and means for heating the trough and thereby supplying heat to the material during its passage therethrough, said heating means including a heating chamber extending along the trough, means for circulating a heating fluid through said chamber, electrical heating units for heating the fluid, means for supplying electric current to said heating units, and automatic means controlled by the level of the said material in the hopper for varying the current supply to said heating units to correspond with variations in the rate of vibration of the trough and thereby varying the amount of heat supplied to the material to correspond with the rate at which the material is fed through said trough.

STEPHEN T. MORELAND.
VICTOR E. HOFMANN.
PARKER C. TRACY.